United States Patent [19]

Tunkel et al.

[11] 3,792,983
[45] Feb. 19, 1974

[54] ETHYLENE AND ACRYLATE ESTERS, THEIR PREPARATION AND THEIR USE AS WAX CRYSTAL MODIFIERS

[75] Inventors: Norman Tunkel, Perth Amboy; Harold N. Miller, Millington; Max J. Wisotsky, Highland Park, all of N.J.

[73] Assignee: Esso Research and Engineering Company, Linden, N.J.

[22] Filed: May 7, 1971

[21] Appl. No.: 141,412

Related U.S. Application Data

[63] Continuation of Ser. No. 717,931, April 1, 1968, abandoned.

[52] U.S. Cl. .......................................... 44/62, 44/70
[51] Int. Cl. ............................................... C10l 1/18
[58] Field of Search..... 44/62, 70; 260/86.7; 208/33

[56] References Cited
UNITED STATES PATENTS

| | | | |
|---|---|---|---|
| 3,638,349 | 2/1972 | Wisotsky et al. | 44/62 |
| 3,260,728 | 7/1966 | Ilnyckyj | 44/62 |
| 3,620,696 | 11/1971 | Hollyday, Jr. et al. | 44/62 |
| 3,089,897 | 5/1963 | Balmer et al. | 260/86.7 |
| 3,126,364 | 3/1924 | Ilnyckyj | 44/62 |
| 3,447,915 | 6/1969 | Otto | 44/62 |

*Primary Examiner*—Daniel E. Wyman
*Assistant Examiner*—Mrs. Y. H. Smith

[57] ABSTRACT

Copolymers of about 4 to 40 molar proportions of ethylene and one molar proportion of acrylate ester, having number average molecular weights of 1,000 to 50,000 and prepared by free radical catalysis under pressures above 2,000 psig. are useful as wax crystal modifiers.

4 Claims, No Drawings

ETHYLENE AND ACRYLATE ESTERS, THEIR PREPARATION AND THEIR USE AS WAX CRYSTAL MODIFIERS

This application is a continuation of Ser. No. 717,931, now abandoned.

BACKGROUND OF THE INVENTION

This invention relates to ethylene-alkyl acrylate copolymers useful as wax crystal modifiers, such as pour depressants for distillate petroleum oils and as dewaxing aids for lube oil stocks, and methods for production of said copolymers under pressures above 2,000 psig. by free radical catalysis.

DESCRIPTION OF THE PRIOR ART

Various copolymers of ethylene and acrylates are well known, and several have been proposed for use in distillate fuel oil as pour depressants. Thus, U.S. Pat. No. 3,126,364 teaches a process for preparing such copolymers of 1,000 to 3,000 molecular weight as pour depressants for middle distillates, including copolymers of ethylene and methyl methacrylate, in a solvent at temperatures of 280° to 340°F. under ethylene pressures of 700 to 2,000 psig., using a peroxide catalyst and adding methyl methacrylate monomer during the reaction. Canadian Pat. No. 676,875 teaches petroleum distillate oil containing as a pour depressant, copolymers of ethylene and 6 to 40 wt. percent alkyl acrylate, e.g., ethyl acrylate, said copolymers having a molecular weight of 800 to 10,000. This Canadian patent teaches preparing said copolymers in a solvent, at temperatures of 250° to 340°F. and ethylene pressures of 1,000 to 2,000 psig., using ditertiary butyl peroxide catalyst and adding alkyl acrylate during the course of the polymerization.

It has now been found that ethylene-acrylate copolymers, which are more effective as fuel oil distillate pour depressants than those of the prior art, can be prepared by the process of the present invention which uses higher pressure than that taught by the aforesaid prior art. Surprisingly, the copolymers of the invention, which are prepared at higher pressures, are more effective as pour depressants than similar copolymers prepared at lower pressures, even though relative molar ratios of monomers in copolymers are comparable. While not known with certainty, the explanation for the increased pour depressancy obtained at higher copolymerization pressures, may be as follows: Acrylates, under free radical polymerization conditions, tend to homopolymerize in preference to polymerizing with ethylene. Thus, ethylene-acrylate copolymers of the aforesaid prior art are believed to contain blocks of acrylate monomers separated by polymethylene segments. However, the increased pressure of the present invention, results in a higher number of ethylene molecules dissolved in the solvent relative to the acrylate molecules that are present in the reaction mixture at any time. In view of this, the acrylate monomer, even though it has a preference to homopolymerize, has an increased chance of joining with an ethylene monomer, with the result that the resulting polymer chain will contain smaller and less frequent blocks of acrylate monomer. It is believed that the greater frequency of repeating ethylene units obtained at higher pressures results in greater interaction with the n-paraffin molecules which constitute the wax, so as to result in greater pour depressant activity. It is further believed that the higher pressure of copolymerization forms polymethylene groups in the copolymer which are more similar to the crystallizing n-paraffins constituting the wax so that the copolymer is more readily accepted into growing wax crystals. However, once the copolymer is accepted into the growing wax crystal, it is believed that the wax-dissimilar acrylate groups hinder further growth of the wax crystal. In any event, the net result is a greater number of smaller wax crystals using the high pressure copolymer than the low pressure copolymer. These smaller wax crystals result in lower pour points since they cannot trap the liquid phase of the oil as effectively as larger interlocking wax crystals.

SUMMARY OF THE INVENTION

The copolymers of the invention will comprise at least 80 mole percent of a mixture of ethylene and acrylate, which mixture will consist of about 4 to 40, preferably 5 to 30, molar proportions of ethylene per molar amount of acrylate, said polymer being oil-soluble and having a number average molecular weight in the range of about 1,000 to 50,000, preferably about 2,000 to about 10,000 as measured by Vapor Phase Osmometry, for example by using a Mechrolab Vapor Phase Osmometer Model 310A. In some cases, 0 to 20 mole percent, usually 1 to 10 mole percent of a third or even fourth monomer, for example a higher alpha olefin, may be included in the polymer. Thus, some recent work has shown that incorporating certain additional monomers into the polymers tend to further improve the performance of the polymer.

The acrylate monomers include those of the general formula:

wherein X is hydrogen or methyl, and Y is

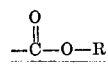

wherein R is $C_1$ to $C_{16}$, preferably $C_1$ to $C_6$, straight or branched chain alkyl groups. Such acrylate esters include methyl acrylate, methyl methacrylate, ethyl acrylate, ethyl methacrylate, isopropyl acrylate, isobutyl acrylate, $C_8$ Oxo acrylate, isobutyl methacrylate, lauryl acrylate, $C_{13}$ Oxo methacrylate, etc.

The Oxo alcohols mentioned above are isomeric mixtures of branched chain aliphatic primary alcohols prepared from olefins, such as polymers and copolymers of $C_3$ to $C_4$ monoolefins, reacted with CO and hydrogen in the presence of a cobalt-containing catalyst such as cobalt carbonyl, at temperatures of about 300° to 400°F., under pressures of about 1,000 to 3,000 psi., to form aldehydes. The resulting aldehyde product is then hydrogenated to form the Oxo alcohol which is then recovered by distillation from the hydrogenated product.

Examples of the aforementioned additional monomers that can be included up to about 20 mole percent of the ethylene-acrylate copolymers of the invention are: $C_3$ to $C_{16}$ alpha monoolefins which can be either branched or unbranched, such as propylene, isobutene, n-octene-1, isooctene-1, n-decene-1, dodecene-1; ethylenically unsaturated esters of $C_2$ to $C_{16}$ straight or branched chain saturated fatty acids and vinyl alcohol, such as vinyl acetate, vinyl laurate; etc.

In general, the polymerizations can be carried out as follows: Solvent, and 0-50 wt. percent, of the total amount of acrylate ester used in the batch, are charged to a stainless steel pressure vessel which is equipped with a stirrer. The temperature of the pressure vessel is then brought to the desired reaction temperature and pressured to the desired pressure with ethylene. Then catalyst, preferably dissolved in solvent so that it can be pumped, and additional amounts of unsaturated ester, are added to the vessel continuously, or at least periodically, during the reaction time, which continuous addition gives a more homogeneous copolymer product as compared to adding all the unsaturated ester at the beginning of the reaction. Also during this reaction time, as ethylene is consumed in the polymerization reaction, additional ethylene is supplied through a pressure controlling regulator so as to maintain the desired reaction pressure fairly constant at all times. Following the completion of the reaction, the liquid phase of the pressure vessel is distilled to remove the solvent and other volatile constituents of the reacted mixture, leaving the polymer as residue.

Usually, based upon 100 parts by weight copolymer to be produced, then about 50 to 1200, preferably 100 to 600, parts by weight of solvent, and about 5 to 20 parts by weight of catalyst, will be used.

The solvent can be any non-reactive organic solvent for furnishing a liquid phase reaction which will not poison the catalyst or otherwise interfere with the reaction, and preferably is a hydrocarbon solvent such as benzene and hexane.

In general, the catalyst can be any of the conventional free radical catalyst, such as peroxide or azotype catalyst, including the acyl peroxides of $C_2$ to $C_{18}$ branched or unbranched carboxylic acids, as well as other common catalysts. Specific examples of such catalysts include di-benzoyl peroxide, di-tertiary butyl peroxide, di-tertiary butyl perbenzoate, tertiary butyl hydroperoxide, di-acetyl peroxide, di-ethyl peroxycarbonate, 2-phenyl propane -2-hydroperoxide (known also as cumene hydro-peroxide), $\alpha,\alpha'$azo-diisobutyronitrile, di-lauroyl peroxide, etc.

The temperature used during the reaction will usually depend upon the choice of the free radical catalyst and its rate of decomposition and will usually range from 70° to 250°C.

The pressures employed are above 2,000 psig., for example 2,100 up to 50,000 psig., preferably 3,000 to 10,000 psig. This pressure can be attained by maintaining a fairly continuous and constant pressure on the reaction chamber through controlling the inlet feed of ethylene.

The time of reaction will depend upon, and is interrelated to, the temperature of the reaction, the choice of catalyst, and the pressure employed. In general, however, one-half to 10, usually 1 to 5, hours will complete the reaction.

The polymers of the invention will generally be added to hydrocarbon oils in amounts of 0.001 to 2 wt. percent, preferably 0.005 to about 0.5 wt. percent, said wt. percent based upon the weight of the oil to be treated.

The hydrocarbon oils, which are treated for pour depression with the polymers of this invention, include cracked and virgin distillate oils boiling in the range of 250° to 750°F. such as heating oil, diesel fuel oil, etc. In addition, the copolymers of the invention can be used as dewaxing aids.

In dewaxing, wax is separated from petroleum oil, such as lubricant base stocks, by blending the oil with a low freezing solvent in which the wax is substantially insoluble, such as toleuene, chilling the resulting oil-solvent blend to precipitate the wax and then filtering the wax. The filtration rate is determined primarily by the size and shape of the wax crystals formed during the chilling step of the process. Very fine crystals tend to clog the filter media rapidly, reducing the filtration rate. Very large crystals tend to form gel-like interlocking masses, which do not form a compact filter cake but rather contain a large amount of oil and solvent and are difficult to wash. As a solution to these problems, it has become the practice to incorporate in the wax-containing petroleum oil, materials which modify the size and shape of wax crystals in such a manner as to permit more rapid separation of the wax during dewaxing operations. It has been found that copolymers of the invention are effective solvent dewaxing aids for bright stocks and solvent neutrals.

The copolymers of the invention may be used alone as the sole oil additive, or in combination with other oil additives such as other pour depressants or dewaxing aids; corrosion inhibitors; antioxidants; sludge inhibitors; sludge dispersants; etc.

The invention will be further understood by reference to the following examples which include preferred embodiments of the invention.

EXAMPLE I

A copolymer of ethylene and ethyl acrylate was prepared as follows: A three liter stirred autoclave was charged with 1125 ml. of benzene as solvent. The autoclave was then purged with nitrogen and then with ethylene. It was then heated to a temperature of about 150°C. ± 2°C., while ethylene was pressured into the autoclave to a pressure of 6,000 psig. Then, while maintaining the temperature at about 150°C., a solution consisting of 28 wt. percent di-tertiary butyl peroxide dissolved in 72 wt. percent benzene in order to facilitate pumping was continuously injected into the autoclave at a rate of 30 cc. per hour until 31 cc. of said peroxide solution had been added. During the same time, the peroxide was added, 245 cc. of ethylene acrylate was continuously injected into the autoclave at the rate of 240 cc. per hour. Additional ethylene was pressured periodically into the autoclave so as to maintain the pressure continuously at 6,000 psig. After all the peroxide and acrylate was added, the contents of the autoclave were maintained at said temperature for an additional period of 15 minutes. Then the temperature of the reactor contents was quickly lowered to about 50°C. over about 20 minutes. The reactor was depressurized and the contents of the autoclave waa discharged. The benzene was evaporated from the discharged contents over a steam bath, while blowing with nitrogen, to leave a total of 410 grams of a wax-like polymer having a number average molecular weight of 7,203 determined by vapor phase osmometry (VPO) and a saponification number of 91.0 mg.KOH/gm.

Comparison Copolymer A

Copolymer A was prepared from ethylene with ethyl acrylate substantially according to the method of Example I with the main exception that a pressure of 1,500 psig was used in place of the 6,000 psig pressure of Example I, and other variations as noted in Table I.

0.02 wt. percent of each of the copolymers prepared above were added to a middle distillate heating oil hereinafter identified as Fuel A and tested for pour depressing ability. Fuel A, a commercial heating oil, consisted of a mixture of 50/50 of virgin to cracked gas oil, the mixture boiling in the range of 340° to 636°F. Typical inspections on Fuel A are: Cloud point of 4°F., aniline point of 132°F., API gravity of 33.0, viscosity of 34.2 SUS. at 100°F., and a pour point of about 0° to 5°F.

A brief summary of the method of preparation of the above copolymers and their effectiveness as pour depressants follow in Table I:

TABLE I

|  | Example 1 | A |
|---|---|---|
| Ethyl Acrylate, cc. | 245 | 276 |
| Di-t-butyl peroxide, gm. (100%) | 6.3 | 15.9 |
| Benzene, ml. | 1125 | 1125 |
| Pressure, psig. | 6000 | 1500 |
| Temperature, °C. | 150 | 150 |
| Ml./Hr. peroxide solution | 30 | 30 |
| CC./Hr. Ethyl acrylate | 240 | 120 |
| Total Time, min. | 75 | 180 |
| Mol. Wt. Copolymer (VPO) | 7203 | 2525 |
| Mol. % Ethylene | 95 | — |
| Pour Point with 0.02 wt. % copolymer in Fuel A, °F. | −30 | −15 |

EXAMPLE II

The ethylene-ethyl acrylate copolyer of Example I above was tested for its effectiveness in dewaxing heavy lube oil stock having the following properties:

Properties of Test Oil*

Inspection
- ASTM Viscosity at 210°F., SUS. 135
- Boiling Point Range, °F. 400–900
- ASTM Pour Point, °F. 145
- ASTM Gravity, °API, 60/60 °F. 27.1
- Wax Content, Wt. % 12

*Bright stock from East Mississippi crude.

0.05 wt. percent of the copolymer of Example I was added to the test oil by simple mixing at 150°F. in a conventional solvent dewaxing process, i.e., by diluting with hexane at a hexane/oil ratio of 3.5/1 and then chilling at the rate of 2°F. per minute from a feed temperature of 145°F. to a filter temperature of −30°F. The chilled mixture was then continuously filtered through a leaf filter at a pressure differential of 20 inches of mercury. The filtration cycle consisted of a filtration time of 36 seconds, a drying time of 9 seconds, a wash time of 27 seconds, and a second drying time of 18 seconds. The oil containing the 0.05 wt. percent polymer was found to filter at a rate 2.24 faster than the same oil without the polymer, clearly demonstrating the effectiveness of the polymer as a dewaxing aid.

EXAMPLE III

A series of copolymers of ethylene and isobutyl acrylate (III–a to III–c) were prepared at different pressures in the same general manner as described in Example I, except for the changes noted in Table II, which follows. The resulting copolymers were tested for pour depressing ability in middle distillate fuel oil (hereinafter called Fuel B) having a cloud point of about +25°F., and a pour point of +20°F. The specific copolymers prepared, the reaction conditions and the ASTM pour point obtained in Fuel B using 0.02 wt. percent copolymer are summarized in the following Table II:

TABLE II

|  | EXAMPLES | | |
|---|---|---|---|
|  | III-a | III-b | III-c |
| Polymer Preparation | | | |
| Peroxide Catalyst | — — ditertiary butyl peroxide — — | | |
| Reaction Temp., °C. | 150 | 150 | 150 |
| Reaction Pressure, psig. | 1150 | 1700 | 2500 |
| Benzene, ml. | 1000 | 1000 | 1000 |
| Injection Charges | | | |
| Isobutyl Acrylate (gm./hr.) | 90 | 90 | 90 |
| Injection Time for isobutyl acrylate, hours | 2¼ | 2½ | 1¼ |
| Isobutyl acrylate, total, gm. | 200 | 200 | 110 |
| Gm./hr. Catalyst | 6.2 | 6.2 | 6.2 |
| Injection Time for catalyst, hr. | 2½ | 2½ | 1½ |
| Total Reaction Time, hr. | 2¾ | 2¾ | 1¾ |
| Polymer Properties | | | |
| Yield, gm. | 493 | 488 | 310 |
| Wt. % Isobutyl Acrylate (By Sap. No.) | 12.1 | 16.2 | 15.0 |
| Mol. Ratio, ethylene/isobutyl acrylate | 33/1 | 23.7/1 | 25.9 |
| Molecular Weight (VOP) | 2010 | 3590 | 4355 |
| Pour Point, Fuel B (0.02 wt. %), °F. | +5 | +5 | −30 |

As seen by the data of Table II, the higher pressure of III–c increased the effectiveness of the copolymer as a pour depressant in Fuel B and also decreased the reaction time needed to make the copolymer.

EXAMPLE IV

A series of copolymers of ethylene and ethylene acrylate, a to e, were made as follows:

A 3 liter stirrer autoclave was charged with 1,200 ml. of benzene as solvent and 23 gm. of ethyl acrylate. Ethylene was pressured into the autoclave and the autoclave was heated to 150°C. While maintaining the temperature at 150°C., 9.1 gm. per hour of ethylene acrylate and 9 gm. per hour of a solution consisting of 23 wt. percent of di-tertiary butyl peroxide dissolved in 77 wt. percent benzene, (or 18 gm. per hour of a 23 wt. percent di-lauroyl peroxide solution in benzene) was continuously injected into the autoclave during the course of the reaction. Ethylene was also added periodically into the autoclave to maintain the desired pressure. At the end of the reaction all further injection of peroxide and ethyl acrylate was stopped, the autoclave was depressurized and the resulting copolymer was recoverd in a manner similar to that described in Example I.

The exact reaction conditions, and the pour point obtained by addition of 0.1 wt. percent copolymer to a middle distillate heating oil having a cloud point of +25°F. and a pour point of +15°F., are summarized in the following Table III:

TABLE III

|  | EXAMPLE IV | | | | |
| --- | --- | --- | --- | --- | --- |
|  | a | b | c | d | e |
| Polymer Preparation | | | | | |
| Peroxide Catalyst* | DTB | DTB | DLP | DLP | DLP |
| Reaction Temp., °C. | 150 | 135 | 110 | 110 | 110 |
| Reaction Pressure, psig. | 4000 | 6000 | 3000 | 4000 | 6000 |
| Initial Charges | | | | | |
| Benzene, ml. | 1200 | 1200 | 1200 | 1200 | 1200 |
| Ethyl Acrylate, gm. | 23 | 23 | 23 | 23 | 23 |
| Injection Charges | | | | | |
| Ethyl Acrylate (gm./hr.) | 9.1 | 9.1 | 9.1 | 9.1 | 9.1 |
| Gm./hr. Catalyst (wt. % in Benzene) | 9(23%) | 9(23%) | 18(23%) | 18(23%) | 18(23%) |
| Injection Time for catalyst, minutes | | | | | |
| Total Injection and Time, hrs. | 1.5 | 2.5 | 2.3 | 2.5 | 1.5 |
| Polymer Properties | | | | | |
| Yield, gm./copolymer/gm. catalyst | 99 | 70 | 21 | 19 | 25 |
| Wt. % Ethyl Acrylate (By Sap. No.) | 20.3 | 18.7 | 22.4 | 19.9 | 17.0 |
| Mol. Ration, Ethylene/Ethyl Acrylate | 14.1/1 | 15.5/1 | 12.3/1 | 14.3/1 | 17.5/1 |
| Molecular Weight (VPO) | 3720 | 8480 | 3230 | — | 4680 |
| Pour Point, Fuel Oil (0.1 wt.% polymer) °F. | −25 | −25 | −70 | −45 | −60 |

*DTB — di-tert. butyl peroxide
DLP — di-lauroyl peroxide

Table III illustrates a series of ethylene-acrylate copolymers which were effective as pour depressants made under slightly varying conditions of time, pressures, temperatures and catalysts. Particularly effective copolymers were made at the lower polymerization temperatures of 110°C. (IV–c, d and e), although higher yields per gm. of catalyst were obtained at higher polymerization temperarures.

We claim:

1. An oil composition comprising a major amount of petroleum distillate oil boiling in the range of 250°F. to 750°F. and about 0.001 to 2.0 wt. percent of a pour depressing copolymer of number average molecular weight of about 2,000 to 10,000 consisting of ethylene and acrylate in a relative mole ratio of 5 to 30 molar proportions of ethylene per molar proportion of acrylate, said acrylate being of the formula: $CH_2 = C(X)Y$ wherein X is selected from the group consisting of hydrogen and methyl radicals, and Y is —COOR wherein R is a $C_1$ to $C_6$ alkyl group, said copolymer being prepared by a batch process which comprises copolymerizing ethylene and said acrylate in an inert hydrocarbon solvent with a free radical type polymerization catalyst at an ethylene pressure of about 3,000 to 10,000 psig, for about 1 to 5 hours at 70° to 250°C.

2. A composition according to claim 1, where X is hydrogen, and said acrylate is selected from the group consisting of ethyl acrylate and isobutyl acrylate.

3. A composition according to claim 2, wherein said acrylate is isobutyl acrylate.

4. A composition according to claim 2, wherein said acrylate is ethyl acrylate.

* * * * *